US007594943B2

(12) United States Patent
Oh et al.

(10) Patent No.: US 7,594,943 B2
(45) Date of Patent: Sep. 29, 2009

(54) CYCLONE DUST SEPARATING APPARATUS

(75) Inventors: Jang-keun Oh, Gwangju (KR); Jung-guyn Han, Gwangju (KR); Min-ha Kim, Gwangju (KR); Hak-bong Lee, Jeollanam-Do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 526 days.

(21) Appl. No.: 11/386,476

(22) Filed: Mar. 22, 2006

(65) Prior Publication Data

US 2006/0230726 A1 Oct. 19, 2006

Related U.S. Application Data

(60) Provisional application No. 60/666,143, filed on Mar. 29, 2005, provisional application No. 60/698,387, filed on Jul. 12, 2005.

(30) Foreign Application Priority Data

May 4, 2005 (KR) ...................... 10-2005-0037406
Aug. 5, 2005 (KR) ...................... 10-2005-0071976

(51) Int. Cl.
*B01D 45/12* (2006.01)

(52) U.S. Cl. ............................ 55/345; 55/346; 55/349; 55/428; 55/DIG. 3; 15/353; 95/271

(58) Field of Classification Search .................. 55/345, 55/343, 348, 346, 349, 347, 428, 459.1, DIG. 3; 15/353; 95/271
See application file for complete search history.

(56) References Cited

U.S. PATENT DOCUMENTS 3,425,192 A * 2/1969 Davis .......................... 55/345
6,251,168 B1 6/2001 Birmingham et al. ......... 95/268

(Continued)

FOREIGN PATENT DOCUMENTS

CN 1548244 11/2004

(Continued)

OTHER PUBLICATIONS

Office Action dated Oct. 12, 2007 corresponding to Chinese Patent Application No. 200610058486X.

(Continued)

*Primary Examiner*—Duane Smith
*Assistant Examiner*—Dung Bui
(74) *Attorney, Agent, or Firm*—Ohlandt, Greeley, Ruggiero & Perle, L.L.P.

(57) ABSTRACT

A cyclone dust separating apparatus for separating dust from external air drawn in thereto and discharging the separated dust, comprises at least one first cyclone body having a tubular shape and forming a first cyclone chamber where the external air is rotated; and at least one second cyclone body forming a second cyclone chamber where the air discharged from the first cyclone chamber is rotated again to separate dust, wherein the external air is drawn in through a lower end of the first cyclone chamber and discharged through an upper end of the first cyclone chamber, and the air discharged from the first cyclone chamber is drawn in through an upper end of the second cyclone chamber and discharged through an upper end of the second cyclone chamber.

5 Claims, 7 Drawing Sheets

U.S. PATENT DOCUMENTS

| | | | | |
|---|---|---|---|---|
| 6,344,064 | B1 | 2/2002 | Conrad | 55/337 |
| 6,428,589 | B1 | 8/2002 | Bair et al. | 55/318 |
| 6,502,278 | B2 | 1/2003 | Oh et al. | 15/353 |
| 6,782,585 | B1 * | 8/2004 | Conrad et al. | 15/353 |
| 6,974,488 | B2 * | 12/2005 | Dyson | 55/346 |
| 6,989,039 | B2 * | 1/2006 | Vuijk | 55/343 |
| 7,335,241 | B2 * | 2/2008 | Oh et al. | 55/343 |
| 7,438,737 | B2 * | 10/2008 | Song et al. | 55/343 |
| 2002/0011053 | A1 * | 1/2002 | Oh | 55/426 |
| 2002/0166200 | A1 * | 11/2002 | Conrad et al. | 15/353 |
| 2004/0112018 | A1 * | 6/2004 | Vuijk | 55/346 |
| 2004/0194250 | A1 * | 10/2004 | Conrad et al. | 15/353 |
| 2005/0050863 | A1 * | 3/2005 | Oh | 55/345 |
| 2005/0050864 | A1 * | 3/2005 | Oh et al. | 55/345 |
| 2005/0172584 | A1 * | 8/2005 | Oh et al. | 55/345 |
| 2005/0251951 | A1 * | 11/2005 | Oh et al. | 15/353 |
| 2005/0252180 | A1 * | 11/2005 | Oh et al. | 55/345 |
| 2006/0090288 | A1 * | 5/2006 | Lee et al. | 15/328 |

FOREIGN PATENT DOCUMENTS

| | | | |
|---|---|---|---|
| CN | 1593323 | | 3/2005 |
| DE | 433085 | | 9/1926 |
| DE | 10056935 | A1 | 2/2002 |
| FR | 2555468 | A1 | 5/1985 |
| GB | 2 406 067 | | 3/2005 |
| GB | 2406065 | A | 3/2005 |
| KR | 1020020072007 | A | 9/2002 |

OTHER PUBLICATIONS

Extended European Search Report dated Jul. 17, 2006 issued from European Patent Office with respect to European Patent Application No. 06290464.4 filed Mar. 22, 2006.

* cited by examiner

CYCLONE DUST SEPARATING APPARATUS

CROSS-REFERENCE TO RELATED APPLICATIONS

This application claims the benefit of U.S. Provisional Applications No. 60/666,143 filed Mar. 29, 2005 and No. 60/698,387 filed on Jul. 12, 2005 in the United States Patent and Trademark Office, and claims the benefit of Korean Patent Applications No. 2005-37406 filed on May 4, 2005 and No. 2005-71976 filed on Aug. 5, 2005 in the Korean Intellectual Property Office, the entire disclosures of all of which are incorporated herein by reference.

BACKGROUND OF THE INVENTION

1. Field of the Invention

The present invention relates to a vacuum cleaner. More particularly, the present invention relates to a cyclone dust separating apparatus mounted in a vacuum cleaner to separate dust from air drawn in from a surface being cleaned.

2. Description of the Related Art

In general cyclone dust separating apparatuses, impurities (hereinafter, referred to as 'dust') are separated from external drawn-in air using a centrifugal force, and the separated dust is collected in a dust collection chamber. Having advantages in lifespan and hygiene in comparison with a conventionally-used dust bag, the cyclone dust separating apparatus has been widely used in a vacuum cleaner nowadays.

A conventional cyclone dust separating apparatus comprises a cyclone chamber having a tubular shape so that drawn-in air rotates therein, an air inlet, and an air outlet. The air inlet is connected tangentially to an upper sidewall of the cyclone chamber for smooth rotation of the air. The air outlet is disposed at an upper end of the cyclone chamber so that the air descending in a rotating manner and ascending back in the cyclone chamber is guided to the outside of the cyclone dust separating apparatus. However, in the conventional cyclone dust separating apparatus having the above structure, the descending rotary air and the ascending air unavoidably collides with each other in the cyclone chamber because both the air inlet and the air outlet are disposed at the upper part of the cyclone chamber, thereby deteriorating dust separating efficiency of the cyclone dust separating apparatus.

In order to overcome such deterioration of the dust separating efficiency, a multi-cyclone dust separating apparatus has been developed and practically used in a vacuum cleaner. The multi-cyclone dust separating apparatus has a first cyclone chamber for separating relatively larger dust and a plurality of second cyclone chambers for separating relatively smaller dust. In general multi-cyclone dust separating apparatus, the first cyclone chamber is disposed in the center while the second cyclone chambers are annularly arranged around the first cyclone chamber.

However, because the air inlet and the air outlet of the first cyclone chamber are both disposed at the upper part thereof in the conventional multi-cyclone dust separating apparatus, arrangement of the second chambers is restricted because the second cyclone chambers should not interfere with the air inlet.

SUMMARY OF THE INVENTION

An aspect of the present invention is to solve at least the above problems and/or disadvantages and to provide at least the advantages described below. Accordingly, an aspect of the present invention is to provide a cyclone dust separating apparatus capable of improving cleaning efficiency by reducing loss of a suction force.

Another aspect of the present invention is to provide a cyclone dust separating apparatus capable of improving flexibility in design.

In order to achieve the above-described aspects of the present invention, there is provided a cyclone dust separating apparatus for separating dust from external air drawn in thereto and discharging the separated dust. The cyclone dust separating apparatus includes at least one first cyclone body having a tubular shape and forming a first cyclone chamber where the external air is rotated; and at least one second cyclone body forming a second cyclone chamber where the air discharged from the first cyclone chamber is rotated again to separate dust, wherein the external air is drawn in through a lower end of the first cyclone chamber and discharged through an upper end of the first cyclone chamber, and the air discharged from the first cyclone chamber is drawn in through an upper end of the second cyclone chamber and discharged through an upper end of the second cyclone chamber.

Preferably, a plurality of the second cyclone bodies are annularly arranged around the first cyclone chamber.

According to an embodiment of the present invention, the cyclone dust separating apparatus may further comprise a first inlet penetrating a lower end of the first cyclone body to draw the air into the first cyclone chamber.

The cyclone dust separating apparatus further comprises a discharge pipe extended from the upper end of the first cyclone chamber toward the lower end of the first cyclone chamber to be partially inserted in the first cyclone chamber and having a first outlet for discharging the air cleaned by the first cyclone chamber; a first dust discharge port formed at an upper part of an outer circumference thereof to discharge the dust separated by the first cyclone chamber; and a first dust collection chamber collecting the dust discharged through the first dust discharge port, The cyclone dust separating apparatus further comprises a first connection path guiding the air discharged through the first outlet branchingly to second inlets formed at the upper ends of the respective second cyclone chambers; a second dust discharge port formed at the lower ends of the respective second cyclone chambers; a second dust collection chamber collecting the dust discharged through the respective second dust discharge ports; and a second connection path having a second outlet at an end thereof to guide the air being discharged from the respective second cyclone chambers.

The cyclone dust separating apparatus further comprises a third outlet connected to the other end of the second connection path to collectively discharging the air being discharged through the second outlet.

The cyclone dust separating apparatus further comprises a cyclone main body having a tubular shape enclosing the first cyclone body and the second cyclone body, wherein the cyclone main body comprises a tubular inner wall surrounding the first cyclone body at a predetermined distance from the first cyclone body, and a tubular outer wall surrounding the inner wall at a predetermined distance from the inner wall, the first dust collection chamber is disposed between the first cyclone chamber and the inner wall while the second dust collection chamber between the inner wall and the outer wall.

The respective second cyclone chambers are formed as an inverse cone having a diameter reducing from an upper end to a lower end, and are tilted so that part of a sidewall of each second cyclone body, facing an outer wall of the cyclone main body, is disposed parallel with the outer wall of the cyclone main body.

The cyclone dust separating apparatus may further comprise a cover member mounted at the upper end and having second cyclone mounting holes corresponding to the upper ends of the second cyclone bodies for mounting of the plurality of second cyclone bodies in the cyclone main body.

According to second embodiment of the present invention, the cyclone dust separating apparatus further comprises a bottom surface constituting a bottom of the first cyclone body; and a first inlet penetratingly formed at the bottom surface to guide the air drawn in from the outside into the first cyclone chamber.

The cyclone dust separating apparatus further comprises a ceiling having the first outlet that guides the air discharged from the first cyclone chamber and mounted at an upper part of the first cyclone body; a guide member formed in the first cyclone chamber to cover an upper part of the first inlet and partially spirally formed so that the external air drawn in through the first inlet is rotated and guided upward to the first outlet; a first dust discharge port formed at an upper part of an outer circumference of the first cyclone chamber disposed in the vicinity of the ceiling; and a first dust collection chamber collecting the dust discharged through the first dust discharge port.

The ceiling comprises a discharge pipe extended from the ceiling toward the bottom surface of the first cyclone chamber and having the first outlet at the lower end thereof, and the first outlet is disposed lower than the first dust discharge port.

The discharge pipe has a skirtlike form expanding as going distanced from the first cyclone chamber so that rotational radius of the air ascending and rotating in the first cyclone chamber increases as going toward the upper end of the first cyclone chamber.

The bottom surface has a suction duct protruded downward in a corresponding form to the first inlet, and the suction duct is inserted in a mounting opening which is formed at a bottom of a dust collecting chamber of a vacuum cleaner in a corresponding form to the suction duct to removably mount the first cyclone body.

A grill member is removably mounted to the first outlet.

The cyclone dust separating apparatus may further comprise a first connection path guiding the air discharged through the first outlet branchingly to second inlets formed at the upper ends of the respective second cyclone chambers; a second dust discharge port formed at the lower ends of the respective second cyclone chambers; a second dust collection chamber collecting the dust discharged through the respective second dust discharge ports; and a second connection path having a second outlet at an end thereof to guide the air being discharged from the respective second cyclone chambers.

The cyclone dust separating apparatus may further comprise a cyclone main body enclosing the first and the second cyclone bodies and mounted with the upper ends, which are opened, of the first cyclone chamber and the second cyclone chambers; an intermediate cover comprising a first connection path of which an inlet is connected to the first outlet and an outlet connected to the second inlet and a second connection path formed as a pipe, and covering the opened upper end of the cyclone main body; and an upper cover having the third outlet collectively discharging the air discharged from the second outlet to the outside and covering an upper part of the intermediate cover.

The cyclone main body comprises a tubular inner wall surrounding the first cyclone body at a predetermined distance from the first cyclone body, and a tubular outer wall surrounding the inner wall at a predetermined distance from the inner wall and connected to the intermediate cover by the upper end thereof, the first dust collection chamber is disposed between the first cyclone chamber and the inner wall while the second dust collection chamber between the inner wall and the outer wall.

The respective second cyclone chambers are formed as an inverse cone having a diameter reducing from an upper end to a lower end, and are tilted so that part of a sidewall of each second cyclone body, facing an outer wall of the cyclone main body, is disposed parallel with the outer wall of the cyclone main body.

Preferably, an interval between the inner wall and the outer wall is substantially equal to a diameter of the second dust discharge port.

The cyclone main body further comprises a lower cover removably mounted to a lower end of the outer wall to cover the opened lower ends of the first cyclone chamber, the inner wall, and the outer wall.

In addition, a filter member is removably mounted between the upper cover and the intermediate cover to further filter the air moving to the third outlet.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Figure 1:
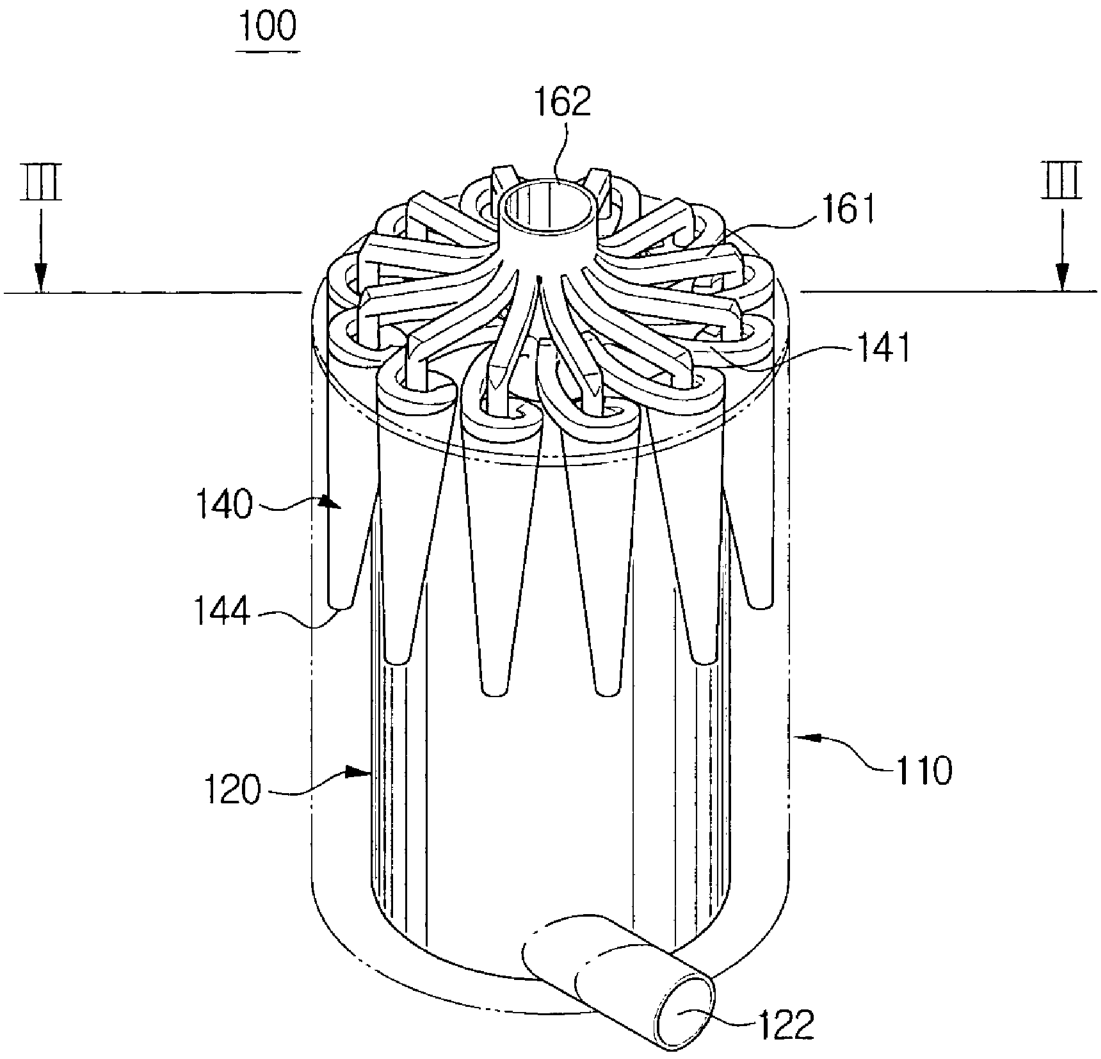
FIG. 1 is a perspective view schematically showing a cyclone dust separating apparatus according to a first embodiment of the present invention.
Figure 2:
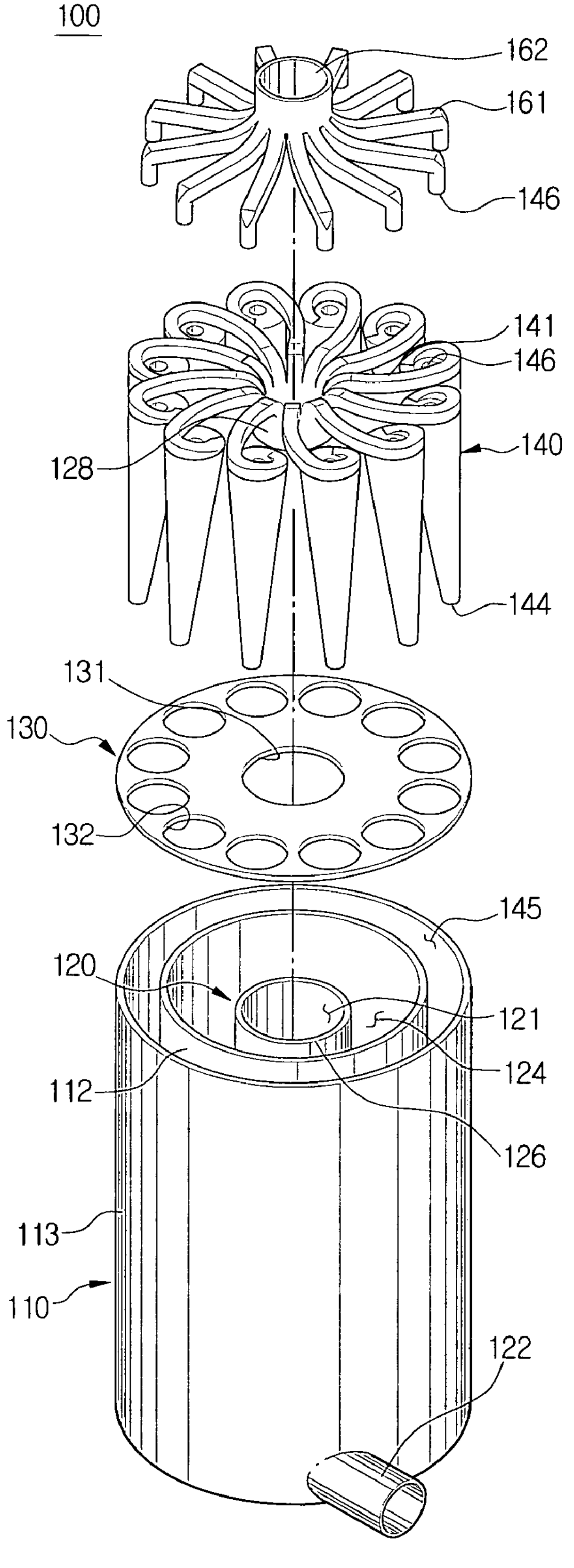
FIG. 2 is an exploded perspective view of the cyclone dust separating apparatus of FIG. 1.

Hereinafter, certain embodiments of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Referring to FIGS. 1 through 4, a cyclone dust separating apparatus 100 according to an embodiment of the present invention comprises a first cyclone body 120 defining a first cyclone chamber 121 for primarily separating relatively larger dust from dust-laden airdrawn in through a first inlet 122, a cover member 130, and a second cyclone body 140 defining a second cyclone chamber 142 for secondarily separating relatively smaller dust from the air primarily cleaned by the first cyclone chamber 121. The cyclone dust separating apparatus 100 includes a cyclone main body 110, which encloses the first and the second cyclone bodies 120 and 140.

Figure 4:
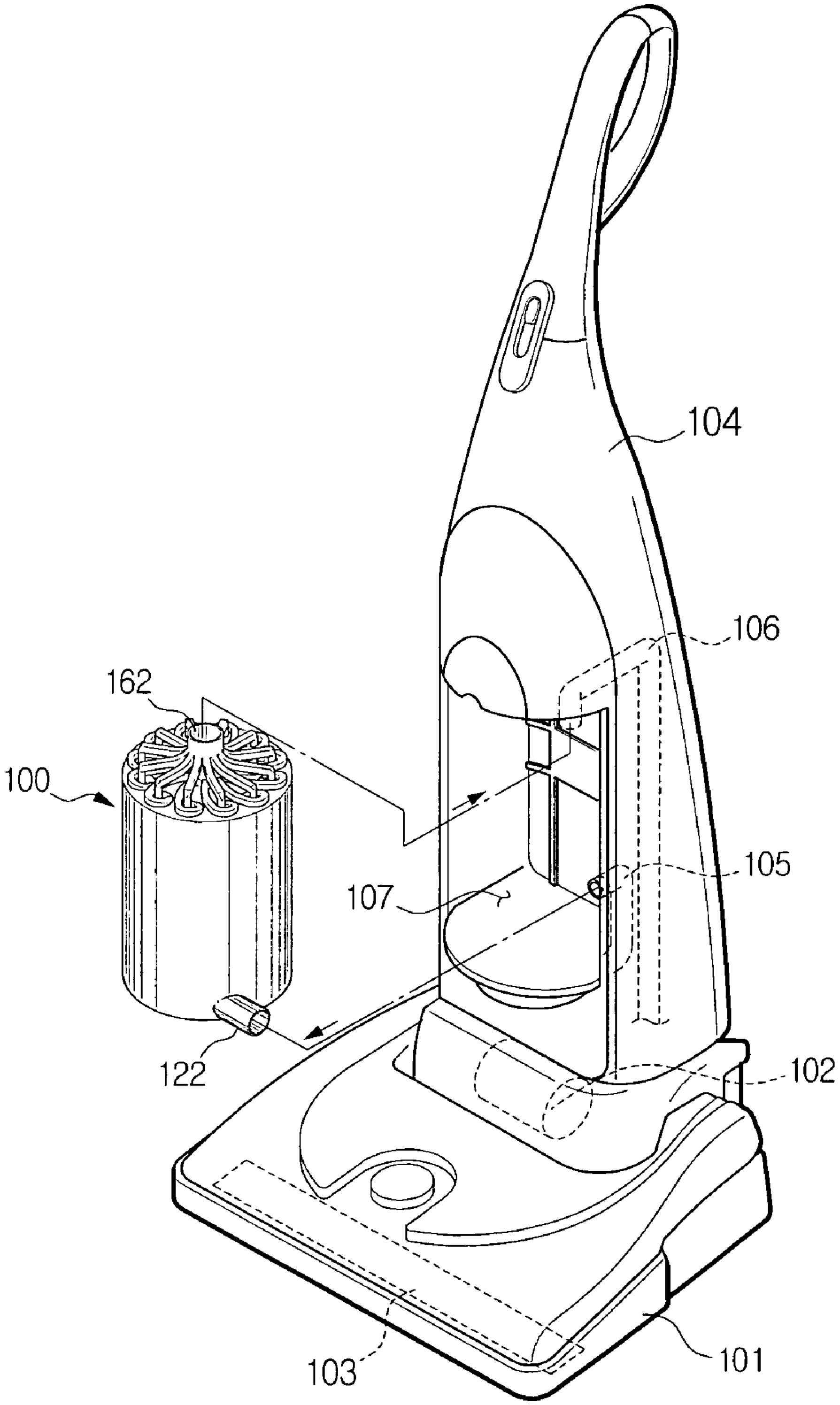
FIG. 4 is an exploded perspective view schematically showing a vacuum cleaner applying the cyclone dust separating apparatus according to the first embodiment of the present invention.

The first cyclone body 120 has a cylindrical shape so that the first cyclone chamber 121 can effectively induce rotation of the air drawn in through the first inlet 122. The first inlet 122 is disposed at a lower end of the first cyclone chamber 121 and fluidly communicates with a suction port 103 (FIG. 4) of the bottom surface brush 101 (FIG. 4). Since the first inlet 122 is formed in a tangential direction with respect to the first cyclone chamber 121, the air drawn in through the first inlet 122 is rotated in the first cyclone chamber 121. A first dust discharge port 123 is annularly formed at an upper end of the first cyclone chamber 121. The dust is raised along a first wall 126 of the first cyclone chamber 121 by a centrifugal force of the air rotating in the cyclone chamber 121 and then is discharged through the first discharge port 123 into a first dust collection chamber 124.

A discharge pipe 128 is disposed at the upper end of the first cyclone chamber 121. A lower end of the discharge pipe 128 is partly inserted in the first cyclone chamber 121. A first outlet 125 is formed at a lower end of the discharge pipe 128 for discharging the air primarily cleaned by the first cyclone chamber 121. The discharge pipe 128 has an enough length so that the first outlet 125 is disposed lower than the first discharge port 123. Because the first inlet 122 is disposed at the lower end of the first cyclone chamber 121, and the first outlet 125 at the upper end of the first cyclone chamber 121, the air drawn in through the first inlet 122 ascends in a rotating manner and escapes through the first outlet 125. Therefore, collision between the air current being drawn in and the air current being discharged in the first cyclone chamber 121 can be prevented, consequently improving the cleaning efficiency.

The first dust collection chamber 124 is formed between the first wall 126 and a second wall 112 of the first cyclone body 120 to collect the dust discharged through the first discharge port 123. A second dust collection chamber 145 is annularly formed to surround the first dust collection chamber 124 to collect the relatively smaller dust separated from the second cyclone chamber 142. The cyclone main body 110 comprises the second wall 112 cylindrically formed to surround the first cyclone body 120 at a predetermined distance from the first wall 126 of the first cyclone body 120, and a third wall 113 cylindrically formed to surround the second wall 112 at a predetermined distance from the second wall. Here, the first dust collection chamber 124 is disposed between the first wall 126 of the first cyclone body 120 and the second wall 112, and the second dust collection chamber 145 is disposed between the second wall 112 and the third wall 113.

The cover member 130 has a center hole 131 for inserting therein the discharge pipe 128. A plurality of second cyclone mounting holes 132 are arranged annularly around the cover member 130 to support an upper part of the second cyclone bodies 140 through upper ends of the second cyclone bodies 140. The cover member 130 simply helps connect the second cyclone bodies 140 within the cyclone main body 110. Therefore, the cover member 130 may be omitted according to design.

According to an embodiment of the present invention, a plurality of the second cyclone bodies 140 are annularly arranged around the first cyclone body 120. A first connection path 141 guides the air primarily cleaned by the first cyclone chamber 121 to the second cyclone chamber 142. The first connection path 141 is connected to the first outlet 125 of the discharge pipe 128 by one end and connected to a second inlet 143 formed at the upper end of each second cyclone chamber 142 by the other end. Since the second inlet 143 is connected to the second cyclone chamber 142 in a tangential direction, the air drawn in through the second inlet 143 can form a rotary air current in the second cyclone chamber 142. For fluid communication between the first cyclone chamber 121 and the plurality of second cyclone chambers 142, the first connection path 141 is provided in the corresponding number to the second cyclone chambers 142. Therefore, the plurality of first connection paths 141 are formed in a manner of branching off from the first outlet 125. The respective first connection paths 141 are partially spirally formed so as to generate the rotary air current in the second cyclone chambers 142.

A second dust discharge port 144 is disposed at a lower end of the second cyclone body 140 having an inverse conical shape. The dust separated in the second cyclone chamber 142 is discharged through the second dust discharge port 144 to the second dust collection chamber 145. A second connection path 161 guides the air being cleaned in the respective second cyclone chambers 142 and discharged. The respective second connection paths 161 have a second outlet 146 at one end and are connected to a third outlet 162 by the other end. The second connection path 161 is provided corresponding to the second outlet 146 in number and converged into the third outlet 162. The third outlet 162 is a path for discharging the air being discharged through the plurality of second connection paths 161, finally from the cyclone dust separating apparatus 100. To this end, the third outlet 162 is fluidly communicated with a driving source 102 (FIG. 4) that generates a suction force.

The second cyclone bodies 140 are shaped as an inverse cone having a diameter reducing from an upper end to a lower end. Also, the second cyclone bodies 140 are annularly arranged around the first cyclone body 120 at regular intervals. The second cyclone bodies 140 are inserted in the second dust collection chamber 145 so as to be arranged parallel with the first cyclone body 120. By thus arranging the first and the second cyclone bodies 120 and 140 in parallel, height of the cyclone dust separating apparatus 100 can be reduced. In addition, by disposing the first inlet 122 at the lower end of the first cyclone chamber 121, the number and the arrangement of the second cyclone bodies 140 are not restricted. Therefore, dust separating efficiency can be improved by increasing the number of the second cyclone bodies 140.

The respective second cyclone bodies 140 are defined so that a part 147 of a sidewall of each second cyclone body 140, facing the outer wall 113 of the cyclone main body 110, is disposed parallel with the third wall 113 of the cyclone main body 110. In addition, the respective second cyclone bodies 140 are defined so that a part 148 of the sidewall of each second cyclone body 140, facing the second wall 112, is disposed at an angle with the second wall 112. Because, generally, the first cyclone chamber 121 separates most of the dust and relatively larger dust, it is preferred that the first dust collection chamber 124 has as large volume as possible. According to an embodiment of the present invention, volume of the second dust collection chamber 145 is decreased while volume of the first dust collection chamber 124 is increased.

Figure 3:
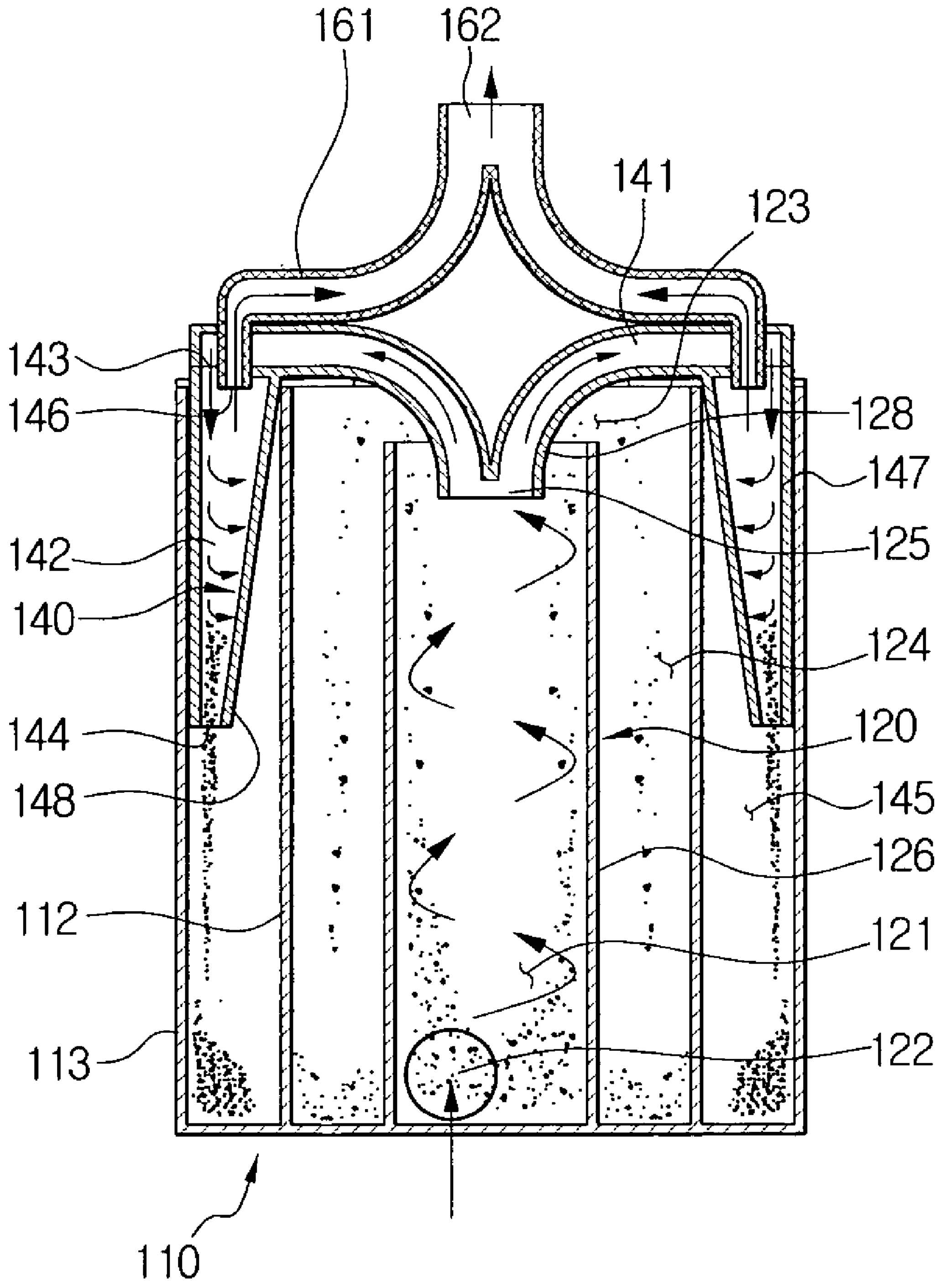
FIG. 3 is a sectional view of FIG. 1 cut along a line III-III.

Hereinafter, the operation of the cyclone dust separating apparatus 100 according to an embodiment of the present invention will be described in greater detail with reference to FIG. 3.

As the suction force is generated by the driving source 102 (FIG. 4), dust-laden air is drawn in through the suction port 103 (FIG. 4) of the bottom surface brush 101. The dust-laden air is drawn into the first cyclone chamber 121 through the first inlet 122 and ascends in a rotating manner. Here, the dust is rotated and raised along the first wall 126 of the first cyclone body 120 by the centrifugal fore of the rotary air current. The dust raised by the ascending air current is discharged through the first dust discharge port 123 and collected in the first dust collection chamber 124. The cleaned air is discharged through the first outlet 125. As described above, the air drawn in through the first inlet 122 reaches the first outlet 146 by generating the air current in one direction, thereby preventing collision between air currents moving in opposite directions. As a result, loss of the suction force decreases, and the cleaning efficiency improves.

The air discharged through the first outlet 125 is drawn into the second cyclone chambers 142 through the first connection path 141 and the second inlet 143. The drawn-in air descends as it rotates in the second cyclone chamber 142. During this, the dust descends along the parts 147, 148 of the sidewall of the second cyclone body 140, being entrained in the descending air current. Then, the dust is discharged through the second dust discharge port 144 and collected in the second dust collection chamber 145. The air cleaned by the second cyclone chamber 142 is raised back to be discharged through the second outlet 146 and the second connection path 161.

FIG. 4 is an exploded perspective view of a vacuum cleaner adopting the cyclone dust separating apparatus 100 according to a first embodiment of the present invention. Referring to FIG. 4, the vacuum cleaner according to an embodiment of the present invention comprises the bottom surface brush 101 having the suction port 103, a cleaner body 104 having the driving source 102, a suction path 105 and a discharge path 106, and the cyclone dust separating apparatus 100 removably mounted to a mounting portion 107 of the cleaner body 104.

The driving source 102 is disposed at a lower part of the cleaner body 104 and may comprise a suction motor for generating the suction force. The suction brush 101 includes the suction port 103 to draw in the dust from a surface being cleaned using the suction force generated by the driving source 102. The suction path 105 is disposed in the cleaner body 104 in fluid communication with the suction port 103 and connected to the first inlet 122 of the cyclone dust separating apparatus 100 by one end thereof. The discharge path 106 is formed at the cleaner body 104. One end of the discharge path 106 is connected to the driving source 102 while the other end is extended to the mounting portion 107 and connected to the third outlet 162 of the cyclone dust separating apparatus 100, as shown in FIG. 4.

The suction force generated by the driving source 102 mounted in the above-structured is sequentially passed through the discharge path 105, the cyclone dust separating apparatus 100 and the suction path 106 and finally transmitted to the suction port 103. The dust on the surface being cleaned is drawn in through the suction port 103 by the suction force. The drawn-in dust is passed through the suction path 105, the cyclone dust separating apparatus 100, the discharge path 106 and the driving source 102 in reverse order and then discharged to the outside. Although an upright vacuum cleaner has been illustrated by way of example, it will be sure understood by those skilled in the art that the cyclone dust separating apparatus of the present invention can be applied to other types of vacuum cleaner, such as a canister vacuum cleaner and a handy vacuum cleaner.

Figure 5:
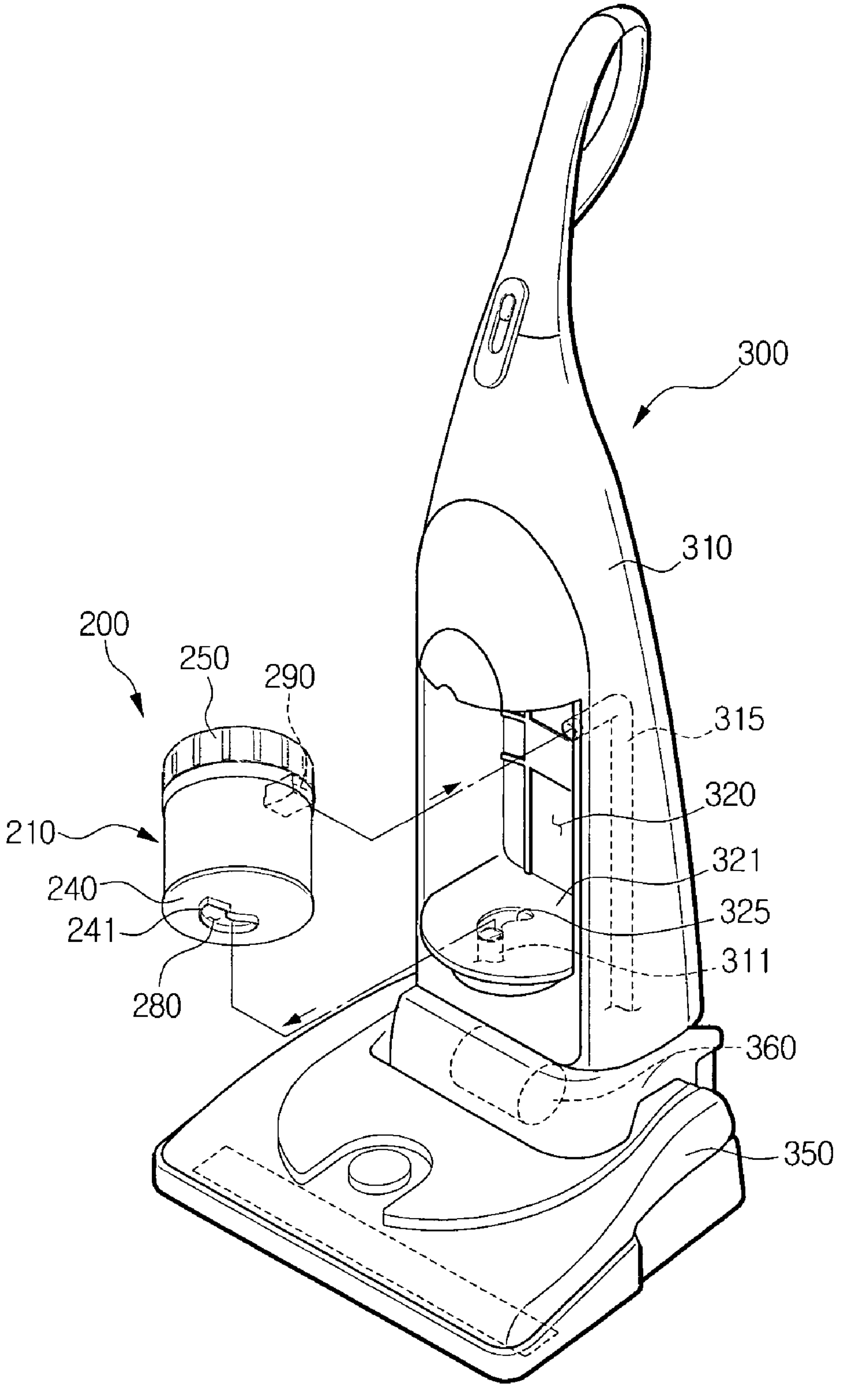
FIG. 5 is an exploded perspective view schematically showing a vacuum cleaner applying the cyclone dust separating apparatus according to a second embodiment of the present invention.
Figure 6:
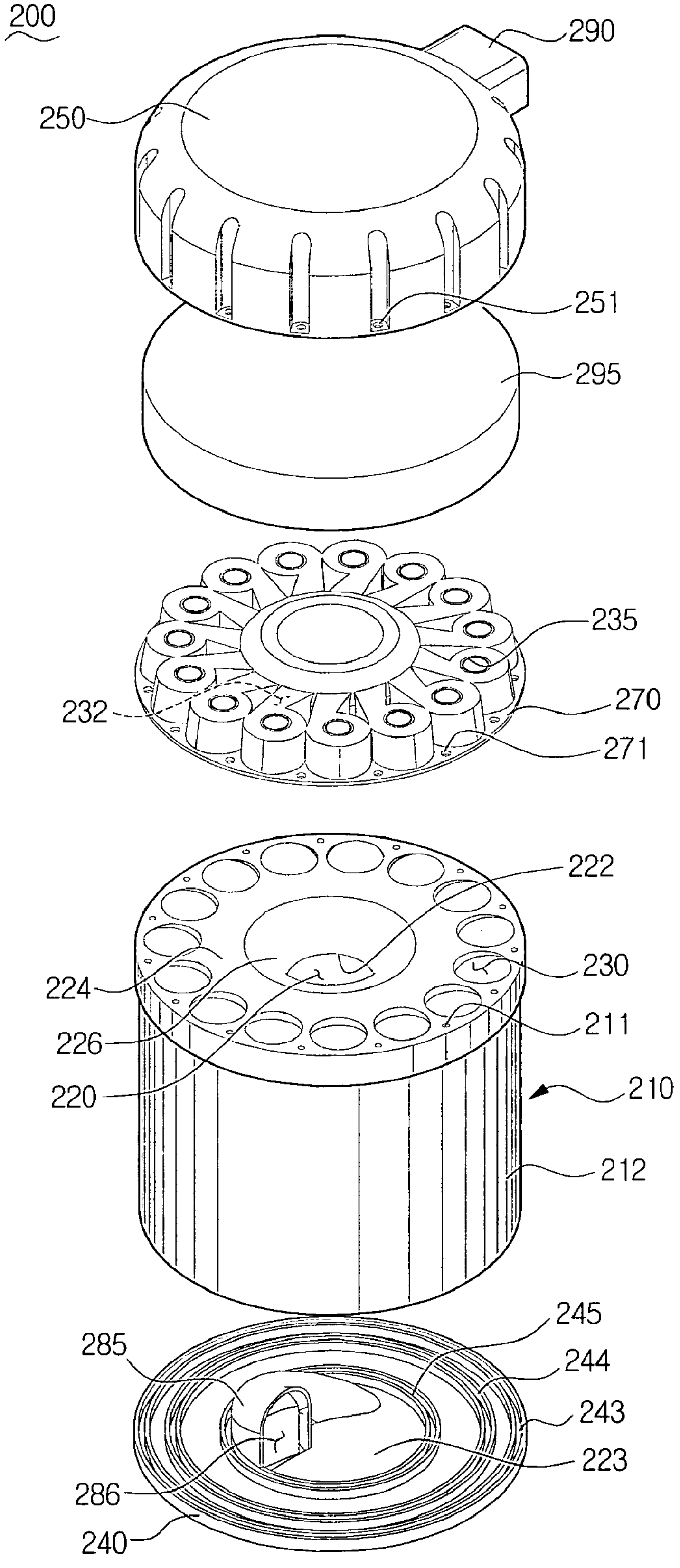
FIG. 6 is an exploded perspective view of the cyclone dust separating apparatus of FIG. 5.
Figure 7:
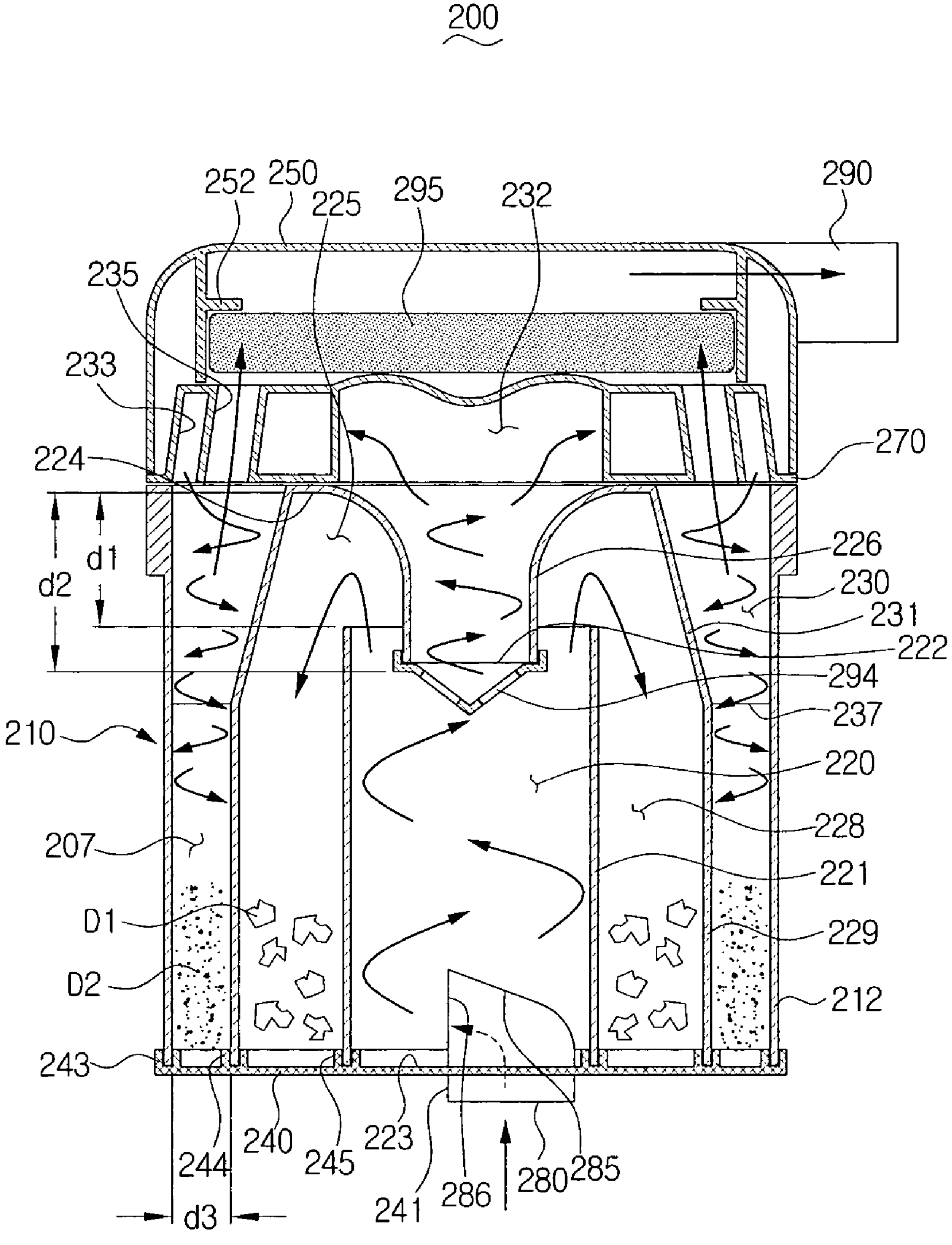
FIG. 7 is a sectional view of FIG. 5, for showing the operation of the cyclone dust separating apparatus.

FIGS. 5 through 7 show a cyclone dust separating apparatus according to a second embodiment of the present invention, and a vacuum cleaner comprising the cyclone dust separating apparatus. With reference to the drawings, the cyclone dust separating apparatus according to the second embodiment of the present invention will now be described in detail.

Referring to FIG. 5, a vacuum cleaner 300 having a cyclone dust separating apparatus 200 of the present embodiment comprises a suction assembly 350 for drawing in the dust on the surface being cleaned, and a cleaner body 310 including therein a suction motor 360 for generating the suction force to draw in the dust. The cleaner body 310 comprises a suction path 311 connected to the suction assembly 350, a discharge path 315 connected to the outside of the cleaner body 320, and a dust collecting chamber 320 disposed between the suction path 111 and the discharge path 315 and mounting the cyclone dust separating apparatus 200.

Referring to FIGS. 5 to 7, the cyclone dust separating apparatus 200 according to the second embodiment of the present invention comprises a plurality of cyclone chambers. To this end, the cyclone dust separating apparatus 200 comprises a cyclone main body 210, an intermediate cover 270 connected to an upper end of the cyclone main body 210, and an upper cover 250 connected to an upper end of the intermediate cover 270. The cyclone main body 210, the intermediate cover 270, and the upper cover 250 are interconnected through fastening screws (not shown) engaged with fastening holes 211, 271, and 251 which are respectively provided thereto.

The cyclone main body 210 comprises a first cyclone body 221 constituting the first cyclone chamber 220, and a plurality of second cyclone bodies 231 constituting the second cyclone chamber 230.

The first cyclone chamber 220 separates the dust from external air drawn in through the suction path 311. For this, the first cyclone chamber 220 is formed inside the cyclone main body 210, being defined by the first cyclone body 221 having a tubular shape mounted inside an outer wall 212 of the cyclone main body 210, a ceiling 224, and a bottom surface 223. An upper end of the first cyclone chamber 220 is opened through a first outlet 222. A first inlet 280 is formed at the bottom surface 223 to guide the air into the first cyclone chamber 220. According to this structure, the air is drawn into the first cyclone chamber 220 by sequentially passing through the suction assembly 350 (FIG. 5), the suction path 311 (FIG. 5), the dust collecting chamber 320 (FIG. 5), and the first inlet 280 and is raised in a rotating manner toward the first outlet 222. As aforementioned, for smooth rotation of the air, a guide member 285 is formed at the bottom surface 223 partially spirally formed to surround an upper part of the first inlet 280 and sloped upward as going to an outlet 286 thereof.

The first cyclone chamber 220 is connected to the first dust discharge port 225 formed on an upper part of an outer circumference thereof. The first dust discharge port 225 of this embodiment is disposed between the upper end of the first cyclone body 221 and the ceiling 224 in a manner that the first cyclone body 221 is apart from the ceiling 224 by a predetermined distance d1. In addition, the first dust discharge port 225 is connected to the first dust collection chamber 228 surrounding the outer circumference of the first cyclone body 221. Here, the first dust collection chamber 228 is defined by an inner surface of an inner wall 229 of the cyclone main body 210 and an outer surface of the first cyclone body 221. The inner wall 229 has a tubular shape and is disposed in the outer wall 212 of the cyclone main body 210 to surround the outer surface of the first cyclone body 221 at a predetermined distance. The first outlet 222 is formed at an end of a discharge pipe 226 protruded downward by a predetermined distance d2 from the ceiling 224. The discharge pipe 226 has an enough length so that the first outlet 222 is disposed lower than the first dust discharge port 225. By the above-structured discharge pipe 226, the ascending rotary air current in the first cyclone chamber 220 can be restrained from being directly discharged through the first outlet 222 when reaching the upper end of the first cyclone chamber 220. Therefore, the dust included in the air being discharged from the first cyclone chamber 220 can be reduced. An opened upper end of the discharge pipe 226 is fluidly communicated with a second inlet 233 of each second cyclone chamber 230 through the first connection path 232 of the intermediate cover 270 disposed at an upper part of the cyclone main body 210.

According to the present embodiment, a dedicated grill member 294 is further provided to the first outlet 222 for higher dust separation efficiency. The discharge pipe 226 according to the present invention, in addition, has a skirtlike form expanding toward the upper end. Therefore, the air rotated at the upper end of the first cyclone chamber 220 is guided to the first dust discharge port 225, thereby improving the dust separation efficiency.

The second cyclone chamber 230 separates relatively smaller dust D2 which is not yet separated by the first cyclone chamber 220. In other words, the second cyclone chamber 230 separates the dust D2 which is relatively smaller than dust D1 separated by the first cyclone chamber 220. In order to separate dust in the above manner, a plurality of the second cyclone chambers 230 are provided to the cyclone main body 210 to radially surround the first cyclone chamber 220. Since the first inlet 280 connected to the first cyclone chamber 20 penetrates the bottom surface 223 of the first cyclone chamber 220, the second cyclone chambers 230 are provided in the number enough to completely surround the first cyclone chamber 220. Accordingly, the dust separation efficiency can be improved.

The second cyclone chambers 230 are formed in the cyclone main body 210 as partitioned by the second cyclone bodies 231, respectively. The second cyclone bodies 231 are opened at the upper end to be connected to the second inlets 233 and the second outlets 235 formed at the intermediate cover 270, respectively. Also, the second cyclone bodies 231 are formed as an inverse cone having a second dust discharge port 237 at the lower end so that the relatively smaller dust D2 can be separated as the air drawn in through the second inlets 233 descends in a rotating manner therein. The second dust discharge port 237 is disposed at an upper part of the second dust collection chamber 207 formed between the inner surface of the outer wall 212 and the outer surface of the inner wall 229 of the cyclone main body 210. In this case, size of the first dust collection chamber 228 is relevant to that of the second cyclone body 231. More specifically, as a diameter of the second cyclone body 231 increases, the second dust collection chamber 207 is expanded, thereby decreasing size of the first dust collection chamber 228. When capacity of the first dust collection chamber 228 is thus decreased, it is inconvenient because the first dust collection chamber 228 collecting larger amount of the dust than the second collection unit 207 should be emptied so frequently.

To overcome the above problem, the respective second cyclone bodies 231 are tilted so that part of a sidewall of each second cyclone body 231, facing the outer wall of the cyclone main body 210, is disposed parallel with the outer wall 212 of the cyclone main body 210. In addition, the second inlet 233 and the second outlet 235 formed at the intermediate cover 270 are tilted accordingly. Therefore, a distance d3 between the outer wall 212 and the inner wall 229, that determines the size of the second dust collection chamber 207, can be reduced to be substantially equal to an inner diameter of the second outlet 235.

In the cyclone main body 210 according to the present embodiment, lower ends of the first and the second dust collection chambers 228 and 207 can be opened and closed selectively by a lower cover 240. For airtightness of the cyclone main body 210, the lower cover 240 comprises connection grooves 245, 244, and 243 having substantially annular shapes to receive lower ends of the first cyclone body 221, the inner wall 229, and the outer wall 212, respectively. The lower cover 240 is integrally formed with a suction duct 241 surrounding the first inlet 280. The suction duct 241 is inserted in a mounting opening 325 formed at the bottom surface 321 of the dust collecting chamber 320. Therefore, the cyclone dust separating apparatus 200 can be correctly positioned when the suction path 111 and the first inlet 280 are connected to each other by mounting the cyclone dust separating apparatus 200. Also, at this time, the suction path 111 and the first inlet 280 can be connected without causing leakage of air.

Hereinafter, the operation of the cyclone dust separating apparatus 200 according to an embodiment of the present invention will be described.

As illustrated in FIGS. 5 through 7, the air drawn in through the suction assembly 350 is passed through the suction path 311, the mounting opening 325, and the first inlet 280 and then drawn into the first cyclone chamber 220 through the lower end of the first cyclone chamber 220. The air drawn into the first cyclone chamber 220 ascends as rotating along an inner surface of the first cyclone body 221 toward the first outlet 222. When the drawn-in air reaches the upper end of the first cyclone chamber 220 adjacent to the first dust discharge port 225, the relatively larger dust D1 is separated from the drawn-in air by the centrifugal force. While descending back and passing through the grill member 294, the dust is further separated from the air from which the larger dust D1 is once separated. Then, the air is branchedly drawn into the respective second cyclone chambers 230 after sequentially passing through the first outlet 222, the first connection path 232, and the second inlet 233. The air drawn into the respective second cyclone chambers 230 descends in a rotating manner along the inner surface of the second cyclone bodies 231. During this, the dust D2, relatively smaller than the dust D1 separated in the first cyclone chamber 220, is separated and collected in the second dust collection chamber 207 through the second dust discharge port 237. The air, from which the smaller dust D2 is separated, ascends back and is discharged from the second cyclone chambers 230 through the second outlet 235. The discharged air is passed through a space formed between the upper cover 250 and the intermediate cover 270 and discharged to the discharge path 315 through an air discharge pipe 290 which is the third outlet formed at one side of the upper cover 250.

According to the present embodiment, the cyclone dust separating apparatus 200 further comprises a filter member 295 between the upper cover 250 and the intermediate cover 270 so as to finally filter the air discharged through the air discharge pipe 290. The filter member 295 is supported by a support rib 252 formed in the upper cover 250 and an upper surface of the intermediate cover 270. According to this structure, as the air drawn into the cyclone dust separating apparatus 200 is passed through the first cyclone chamber 220, the grill member 294, the second cyclone chamber 230, and the filter member 295, the dust can be separated through multi-steps.

According to the above description, the inlet guiding the air to the first cyclone chamber and the outlet guiding the air discharged from the first cyclone chamber are distantly disposed from each other, that is, at the upper end and the lower end of the first cyclone chamber, respectively. Therefore, collision between the ascending air and the descending air can be minimized, thereby restraining loss of the suction force of the cyclone dust separating apparatus.

Furthermore, since the air is drawn into the first cyclone chamber through the lower end of the bottom surface, arrangement of the other cyclone chambers such as the second cyclone chamber becomes flexible, thereby helping downsize the cyclone dust separating apparatus.

In addition, according to second embodiment of the present invention, dust separation efficiency can be further enhanced by separating the dust through multi-steps by the plurality of cyclone chambers and the dedicated grill member and filter member.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cyclone dust separating apparatus for separating dust from external air drawn in thereto and discharging clean air, comprising:
- at least one first cyclone body having a tubular shape and forming a first cyclone chamber where the external air is rotated;
- at least one second cyclone body forming a second cyclone chamber where the air discharged from the first cyclone chamber is rotated again to separate dust, wherein the at least one second cyclone body comprises a plurality of second cyclone bodies annularly arranged around the first cyclone chamber, wherein the external air is drawn in through a lower end of the first cyclone chamber and discharged through an upper end of the first cyclone chamber, and the air discharged from the first cyclone chamber is drawn in through an upper end of the second cyclone chamber and discharged through the upper end of the second cyclone chamber;
- a first inlet penetrating a lower end of the first cyclone body to draw the external air into the first cyclone chamber;
- a discharge pipe extended from the upper end of the first cyclone chamber toward the lower end of the second cyclone chamber to be partially inserted in the first cyclone chamber and having a first outlet for discharging the air cleaned by the first cyclone chamber;
- a first dust discharge port formed at an upper part of an outer circumference thereof to discharge the dust separated by the first cyclone chamber; and
- a first dust collection chamber collecting the dust discharged through the first dust discharge port,
- wherein the first outlet is disposed lower than the first dust discharge port.

2. The cyclone dust separating apparatus of claim 1, further comprising:
- a first connection path guiding the air discharged through the first outlet branchingly to a second inlet formed at the upper ends of each of the plurality of second cyclone chambers;
- a second dust discharge port formed at the lower ends of each of the plurality of second cyclone chambers;
- a second dust collection chamber collecting the dust discharged through the respective second dust discharge ports; and
- a second connection path having a second outlet at an end thereof to guide the air being discharged from each of the plurality of second cyclone chambers.

3. The cyclone dust separating apparatus of claim 2, further comprising a third outlet connected to the other end of the second connection path to collectively discharge the air being discharged through the second outlet.

4. The cyclone dust separating apparatus of claim 2, further comprising a cyclone main body having a tubular shape enclosing the first cyclone body and the second cyclone body,
- wherein the cyclone main body comprises a tubular inner wall surrounding the first cyclone body at a predetermined distance from the first cyclone body, and a tubular outer wall surrounding the inner wall at a predetermined distance from the inner wall,
- the first dust collection chamber is disposed between the first cyclone chamber and the inner wall while the second dust collection chamber between the inner wall and the outer wall.

5. The cyclone dust separating apparatus of claim 4, wherein the plurality of second cyclone chambers are each formed as an inverse cone having a diameter reducing from an upper end to a lower end, and are tilted so that part of a sidewall of each of the plurality of second cyclone bodies, facing the tubular outer wall of the cyclone main body, is disposed parallel with the tubular outer wall of the cyclone main body.

* * * * *